(12) United States Patent
Jackson

(10) Patent No.: US 7,517,398 B2
(45) Date of Patent: Apr. 14, 2009

(54) INKJET INK

(75) Inventor: Christian Jackson, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/900,174

(22) Filed: Sep. 10, 2007

(65) Prior Publication Data

US 2008/0060548 A1 Mar. 13, 2008

Related U.S. Application Data

(60) Provisional application No. 60/843,668, filed on Sep. 11, 2006.

(51) Int. Cl.
*C09D 11/02* (2006.01)
*B41J 2/01* (2006.01)

(52) U.S. Cl. .............. 106/31.43; 106/31.49; 106/31.58; 347/100

(58) Field of Classification Search ............... 106/31.43, 106/31.49, 31.58; 347/100
See application file for complete search history.

(56) References Cited

U.S. PATENT DOCUMENTS

| 5,580,373 | A | * | 12/1996 | Lane et al. ................ | 106/31.43 |
| 5,925,177 | A | | 7/1999 | Carreira et al. | |
| 7,303,272 | B2 | * | 12/2007 | Taguchi et al. ........... | 106/31.46 |
| 7,311,393 | B2 | * | 12/2007 | Taguchi et al. ........... | 347/100 |
| 7,396,398 | B2 | * | 7/2008 | Lee et al. ................. | 106/31.43 |
| 2005/0098063 | A1 | * | 5/2005 | Lee et al. ................. | 106/31.43 |
| 2006/0117994 | A1 | * | 6/2006 | Ryu et al. ................ | 106/31.58 |
| 2007/0040881 | A1 | * | 2/2007 | Ham et al. ............... | 106/31.47 |
| 2008/0060547 | A1 | * | 3/2008 | Jackson .................... | 106/31.13 |
| 2008/0087194 | A1 | * | 4/2008 | Jackson .................... | 106/31.75 |

FOREIGN PATENT DOCUMENTS

WO    WO 01/94476 A2    12/2001

OTHER PUBLICATIONS

English translation of JP05/086314, Apr. 1993.*
PCT International Search Report and Written Opinion for International Application No. PCT/US2007/019698 dated Jan. 28, 2008.

* cited by examiner

*Primary Examiner*—Helene Klemanski

(57) ABSTRACT

The present invention pertains to an aqueous inkjet ink containing a humectant in the liquid vehicle selected from the group consisting of butyl urea, pentyl urea, and any combinations thereof which provides good print reliability and excellent latency with dye colorants. The present invention further pertains to an ink set containing this aqueous inkjet ink, as well as to methods of printing with this ink and ink set on a variety of substrates.

7 Claims, No Drawings

INKJET INK

CROSS-REFERENCE TO RELATED APPLICATIONS

This application claims priority under 35 U.S.C. §119 from U.S. Provisional Application Ser. No. 60/843,668 (filed Sep. 11, 2006), the disclosure of which is incorporated by reference herein for all purposes as if fully set forth.

BACKGROUND OF THE INVENTION

The present invention pertains to an aqueous inkjet ink comprising a particular vehicle which provides good print reliability and excellent decap performance (or latency) with dye colorants.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

A good ink-jet ink is characterized by a number of necessary properties, including color, jettability, decap time (latency), drying time and shelf-life, among others. However, there is often a tradeoff between these properties because improving one property can result in the deterioration of another property.

Ink-jet printhead technology has developed to deliver very small drop sizes. Drop volumes of 1-2 pL are currently possible, which produce extremely high resolution images with no visible graininess. In addition, smaller drops allow an image to be formed with less ink volume per unit area, thus reducing dry-time and improving printer throughput. However, in order to obtain highly colored and chromatic images with less ink, more colorant must be incorporated into the ink.

High colorant concentrations can lead to problems with print reliability and latency. Latency (also known as decap) is the amount of time a printhead can be left uncapped and idle and still fire properly, without the drying ink causing blocked nozzles, mis-directed drops or some other print defect. Problems are exacerbated by the small diameter of the nozzles designed to deliver small volume drops. The smaller nozzles can clog more easily and require a greater force to clear any high viscosity blockage.

An additional problem with higher dye concentration inks is that the dye is more likely to aggregate as it dries on the media, such as glossy photographic paper, causing a phenomenon of "bronzing" whereby specular reflected light appears colored. This is most common in cyan dyes where a reddish bronzing is seen, but can occur with other dyes. Bronzing also increases the glossiness of an the image relative to the substrate causing gloss non-uniformity between different colored areas and the white background. U.S. Patent Publication 2004/0003755 discloses inks with antibronzing properties, in particular inks comprising cyan dye.

U.S. Pat. No. 5,580,373 discloses various compounds, including butyl urea and 1,3-dimethyl urea, as anticurl agents. To be effective, it is taught that anticurl agents must be present in an amount of at least 10% by weight of the total ink. Acceptable ranges for the anti curl agents are indicated to be 10-75 wt %, preferably 12-55% and most preferably 15-30 wt %.

There is still a need for an ink-jet ink formulation that provides outstanding latency (longer decap times) while maintaining reliability and other important jetting characteristics. In particular, there is a need for such a formulation where the colorant is a dye present in relatively high concentration. Still further there is needed a formulation that will provide the foregoing properties with little or no bronzing.

SUMMARY OF THE INVENTION

In one aspect, the present invention pertains to an aqueous dye-based ink-jet ink with improved decap time which, as discussed above, is the amount of time a nozzle can remain dormant and then be fired again without any detrimental effect on the droplet velocity, weight or direction. A longer decap time is preferred because it allows greater productivity by reducing the need for "servicing" the printhead.

The present invention addresses the decap problem, while maintaining reliability and other important jetting characteristics, such as those discussed above, by providing an ink-jet ink comprising an aqueous vehicle and a dye soluble in said aqueous vehicle, wherein the aqueous vehicle comprises water and a first humectant selected from the group consisting of butyl urea, pentyl urea and any combination thereof. The amount of first humectant present in the ink is greater than 2% and less than 12% by weight based on the total weight of ink.

According to the present invention, there is also provided an ink-jet ink as described above, which further contains a second humectant in combination with the butyl urea.

In another aspect, the present invention pertains to an inkjet ink set comprising at least three colored inks, wherein the at least three colored inks comprise a first ink cyan in color, a second ink magenta in color and a third ink yellow in color, wherein at least one of the inks is an ink-jet ink as set forth above.

The present invention further includes a method for ink jet printing onto a substrate, comprising the steps, in any workable order, of:

(a) providing an ink jet printer that is responsive to digital data signals;

(b) loading the printer with a substrate to be printed;

(c) loading the printer with an inkjet ink set forth above; and (d) printing onto the substrate using the inkjet ink set in response to the digital data signals.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF PREFERRED EMBODIMENTS

Vehicle

The ink vehicle is the carrier (or medium) for the colorant and additives, if any. An "aqueous vehicle" refers to a vehicle comprised of water or a mixture of water and at least one water-soluble organic solvent (co-solvent) or humectant.

Selection of a suitable mixture depends on requirements of the specific application, such as desired surface tension and viscosity, the selected colorant, and compatibility with substrate onto which the ink will be printed.

As prescribed herein, the aqueous vehicle comprises a first humectant selected from the group consisting of butyl urea, 1-pentyl urea (amyl urea) and any combination(s) thereof. Written as a formula butyl urea is $CH_3(CH_2)_3NHCONH_2$ and pentyl urea is $CH_3(CH_2)_4NHCONH_2$. Minimum levels of first humectant are in the range of 2 to 3 percent by weight (wt %) based on the total weight of ink. At levels of 2 wt % and below, the amount of first humectant is insufficient to be effective. The upper limit of first humectant is dictated primarily by the limits of solubility. For butyl urea, the upper limit is in the range of 10 to 12 wt %, based on the total weight of ink. Pentyl urea is somewhat less soluble and one of ordinary skill in the art can readily determine appropriate upper limits. Generally, in commercial operation, it will be desirable to formulate inks safely below the upper solubility limit so that the ink remains homogeneous and the formation of a two-phase system is avoided.

The inventive inks may further comprise additional water-soluble co-solvent(s)/humectant(s) such as, for example, alcohols, ketones, keto-alcohols, ethers and others, sulfones, sulfoxides, lactones and lactams; glycerol and derivatives thereof; glycols such as ethylene glycol, di-, tri- and tetra-ethylene glycol, propylene glycol, di- and tri-propylene glycol, trimethylene glycol, butylene glycol, hexylene glycol and thiodiglycol; addition polymers of oxyethylene or oxypropylene such as polyethylene glycol, polypropylene glycol and the like; mono- and di-alkyl ($C_1$-$C_4$) ethers of mono-, di- and tri-ethylene glycol and mono-, di- and tri-propylene glycols; linear or branched $C_4$-$C_8$ diols and triols.

An aqueous vehicle will typically contain about 50% to about 96% water with the balance (i.e., about 50% to about 4%) being the water-soluble solvent/humectant. The prescribed 1,1-diethylurea is part of the co-solvent/humectant component of the vehicle.

Certain co-solvents/humectants have been found particularly desirable in combination with the first humectant. Accordingly, the instant inks can advantageously comprise a second humectant selected from the group consisting of ethylene glycol, diethylene glycol, triethylene glycol, propylene glycol (1,2-propanediol), trimethylene glycol (1,3-propanediol), glycerol, ethoxylated glycerol, 1,4-butanediol, 1,5-pentanediol, 1,6-hexanediol, 2,5-hexanediol, 2-pyrrolidone, sulfolane(tetramethylene sulfone), tetramethylsulfoxide, xylose, fructose, and mannose.

In a preferred embodiment, the instant inks comprise at least about 8 wt % of total co-humectant. That total can be comprised entirely of the prescribed first humectant or a combination of first humectant and second humectant.

In another embodiment, the instant inks comprise 1-15 wt % of second humectant. In yet another embodiment, the cumulative amount of first and second humectant is in the range of 8-25 wt%. In yet another embodiment, the inks comprise 2.5 to 9.99 wt % butyl urea.

Colorant

The colorant prescribed by the present invention is a dye. By definition, a dye is soluble in the ink vehicle. Useful dyes include conventional dyes, such as anionic, cationic, ampho-teric and non-ionic dyes. Such dyes are in general well known to those of ordinary skill in the art.

Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes most useful in this invention are, for example, Acid, Direct, Food, Mordant and Reactive dyes.

Preferred anionic dyes are those selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

Preferred cationic dyes include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds and thiazine compounds, among others, all of which are generally well known to those skilled in the art.

Particularly preferred for this invention are anionic dyes.

Useful CMY dyes include (cyan) Acid Blue 9 and Direct Blue 199; (magenta) Acid Red 52, Reactive Red 180, Acid Red 37 and Reactive Red 23; and (yellow) Direct Yellow 86, Direct Yellow 132 and Acid Yellow 23.

Useful RGB dyes include (red) Reactive Orange 16, Reactive Red 123, Reactive Red 43, Reactive Orange 13, Acid Red 337 and Acid Red 415; (blue) Reactive Blue 49, Reactive Blue 19, Reactive Blue 72, Reactive Blue 21, Acid Blue 83 and Acid Blue 260; and (green) Reactive Green 12.

Inks may also be formed from a mixture of dyes, for example a red ink may be a mixture of Reactive Red 180 and Reactive Yellow 84, and a green ink may be a mixture of Reactive Blue 72 and Reactive Yellow 85.

The preceding dyes are referred to by their "C.I." designation established by Society Dyers and Colourists, Bradford, Yorkshire, UK and published in the The Color Index, Third Edition, 1971.

The dyes are generally present in amounts up to about 15 wt %, more typically from about 0.5 wt % to about 12 wt %. The present invention is advantageous for inks with higher dye loadings, for example inks with at least 3 wt % dye and inks with least 4 wt % dye. Percentages are weight percent of the total weight of ink.

The "dye content" in a given ink refers the total dye present in that ink, whether a single dye species or a combination of two or more dye species.

Other Ingredients (Additives)

Other ingredients, additives, can be formulated into the inkjet ink to the extent that such other ingredients do not interfere with the stability and jetablity of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynol® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in the amount of about 0.01 to about 5% and more typically about 0.2 to about 2%, based on the total weight of the ink.

Polymers may be added to the ink to improve durability or for other purposes. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inventive ink is particularly suited to lower viscosity applications. Thus the viscosity (at 25° C.) of the inventive inks and fixer can be less than about 7 cps, or less than about 5 cps, and even, advantageously, less than about 3.5 cps. Thermal inkjet actuators rely on instantaneous heating/bubble formation to eject ink drops and this mechanism of drop formation generally requires inks of lower viscosity. As such, the instant inks can be particularly advantages in thermal printheads.

Method of Printing

The inks of the present invention can be printed with any suitable inkjet printer. The substrate can be any suitable substrate including plain paper, such as common electrophotographic copier paper; treated paper, such as photo-quality inkjet paper; textile; and non-porous substrates including polymeric films such as polyvinyl choride and polyester.

Inkjet printers are typically equipped with an ink set. An inkjet ink sets comprise at least two differently colored inks, more typically at least three differently colored inks (such as CMY), and preferably at least four differently colored inks (such as CMYK). Ink sets may further comprise one or more "gamut-expanding" inks, including different colored inks such as an orange ink, a green ink, a red ink and/or a blue ink, and combinations of full strength and light strengths inks such as light cyan and light magenta. Any or all of the inks in an ink set can be formulated as prescribed by the present invention.

EXAMPLES

Ink Preparation

Inks were prepared according to the formulations noted in each example. Ingredients, given as weight percent of the total weight of ink, were mixed together and filtered. Water was deionized. Surfynol® 465 is a surfactant from Air Products Corp (Allentown, Pa., USA). Proxel® GXL is a Biocide from Avecia (Wilmington, Del., USA). Silwet® L-7606 is a silicone surfactant from GE Advanced Materials.

Gloss, Chroma and Optical Density Measurements

Inks were printed on Epson Premium Glossy Photo Paper from the appropriate color printhead in a Canon i960 printer using "High Quality" print mode. Gloss (60°) was measured using a Byk Gardner Micro-Tri-Glossmeter. Optical Density (OD) and chroma were measured using a Greytag-Macbeth Spectrolino spectrometer.

Bronzing Evaluation

Prints on Epson Premium Glossy Photo Paper were evaluated visually and given the following ratings.

A A=no bronzing (most desirable); gloss<45
A=just discernable bronzing; gloss<50
B=slight bronzing; gloss<60
C=severe bronzing (least desirable) gloss$\geqq$60

The bronzing values generally correlate with an increase gloss (relative to the unprinted media) so that the more severe the bronzing, the higher the gloss and the greater the undesirable gloss non-uniformity with the medium. The level of bronzing can vary sometimes depending on the particular batch of dye (perhaps related to impurity profile). For comparison of bronzing, batch integrity of dye (especially DB199) was maintained.

Nozzle Strength Test

This test provides a simple way to evaluate how well the ink fires from the printhead and how well it primes the printhead nozzles. The inks were filled into HP 45A cartridges and a nozzle check pattern was printed using an HP DeskJet 800 series printer. The nozzle check pattern consists of a short line printed by each individual nozzle in the printhead. The pattern was evaluated for missing or misdirected lines indicating a problem with firing from a particular nozzle. The nozzle check patterns were rated according to the following criteria:

Good—2 or fewer missing or misdirected nozzles
Fair—2 to 5 missing or misdirected nozzles
Poor—More than 5 missing or misdirected nozzle Latency Test Latency (Decap time) was determined according to the following procedure using a Hewlett Packard 850 printer that was altered so that the ink cartridge would not be serviced during the test. Just prior to the beginning of the test, the nozzles were primed and a nozzle check pattern was performed to ensure all nozzles were firing acceptably. No further servicing was then conducted During each scan across the page, the pen prints a pattern of 149 vertical lines spaced about 1/16 inch apart. Each vertical line was formed by all nozzles firing one drop, therefore the line is one drop wide an about ½ inch high corresponding to the length of the nozzle array on the printhead. The first vertical line in each scan is the first drop fired from each nozzle after the prescribed latency period, the fifth line was the fifth drop from each nozzle on that scan, and so forth for all 149 lines.

The pattern was repeated at increasingly longer time intervals (decap times) between scans. The standard time intervals between scans was 1, 2, 3, 4, 5, 6, 7, 8, 9, 10, 20, 30, 40, 50, 60, 70, 80, 90 100, 200, 300, 400, 500, 600, 700, 800, 900, and 1000 seconds. Nothing beyond 1000 seconds was attempted.

Upon completion of the test, the $1^{st}$, $5^{th}$, and $32^{nd}$ vertical lines in each scan were examined for consistency, misdirected drop deposits, and clarity of the print. These lines correspond to the $1^{st}$, $5^{th}$ and $32^{nd}$ drops of ink droplets ejected from the nozzle after a prescribed latency period. The decap time for each drop was the longest time interval where the particular vertical line can be printed without significant defects.

Preferably, the pen will fire properly on the first drop. However, when the first drop fails to eject properly, the decap time for the fifth and thirty-second drops can provide some information as to the severity of the pluggage and how easily the nozzles can be recovered.

The results tables hereinafter report only the first drop decap time and refer to the value simply as the "Decap" in units of seconds.

Example 1

Inks 1A-1F shown below are formulated with the prescribed amount of first humectant (butyl urea). Results demonstrate that long decap and excellent nozzle strength are achieved. The higher levels of butyl urea are also advantageous for low bronzing.

|  | Ink 1A | Ink 1B | Ink 1C | Ink 1D | Ink 1E |
|---|---|---|---|---|---|
| Ingredients |  |  |  |  |  |
| DB 199 Cyan Dye | 6.0 | 6.0 | 6.0 | 4.0 | 6.0 |
| Butyl urea | 7.0 | 4.0 | 4.0 | 10.0 | 3.0 |
| Diethylene glycol | 5.0 | 7.0 | 5.0 | — | 7.0 |
| 2-pyrrolidone | 3.0 | 5.0 | 3.0 | — | 5.0 |
| Urea | — | — | 3.0 | — | — |
| Surfynol 465 | 0.2 | 0.5 | 0.5 | 0.5 | 0.5 |
| Water (to 100%) | Balance | Balance | Balance | Balance | Balance |
| Properties |  |  |  |  |  |
| Decap | 1,000 | >1,000 | >1,000 | >1,000 | >1,000 |
| Nozzle Strength | Excellent | Excellent | Excellent | Excellent | Excellent |
| Bronzing | AA | C | C | AA | AA |
| Gloss | 40 | 79 | 64 | 39 | 43 |
| Chroma | 67 | 61 | 65 | 74 | 61 |
| Optical Density | 2.33 | 1.71 | 2.05 | 2.38 | 2.23 |

Control Inks 1G-1I are formulated with levels of butyl urea first humectant outside the prescribed range. Results demonstrate that without the required amount of first humectant, the advantageous decap performance is not achieved. In ink 1I, the butyl urea was not completely soluble at 12 wt % and the ink was unsuitable for testing.

|  | Ink 1F | Ink 1G Control | Ink 1H Control | Ink 1I Control |
|---|---|---|---|---|
| Ingredients |  |  |  |  |
| DB 199 Cyan Dye | 6.0 | 6.0 | 6.0 | 6.0 |
| Butyl urea | 3.0 | 2.0 | 1.0 | 12.0 |
| 1,2-hexane diol | 3.0 | — | — | — |
| Diethylene glycol | 7.0 | 7.0 | 7.0 | 7.0 |
| 2-pyrrolidone | 5.0 | 5.0 | 5.0 | 5.0 |
| Surfynol 465 | 0.5 | 0.5 | 0.5 | 0.5 |
| Water (to 100%) | Balance | Balance | Balance | Balance |
| Properties |  |  |  |  |
| Decap | 1,000 | 100 | 60 | * |
| Nozzle Strength | Excellent | Excellent | Excellent | — |
| Bronzing | AA | AA | AA | — |
| Gloss | 42 | 44 | 43 | — |
| Chroma | 60 | 61 | 61 | — |
| Optical Density | 2.20 | 2.19 | 2.25 | — |

* Butyl urea was not entirely soluble at 12%, Ink 1I not tested.

Example 2

Inventive inks 2A-2E below employ magenta and yellow dyes and demonstrate beneficial effects similar to the cyan inks of the previous example. No bronzing evaluation is provided as this property is not typically an issue with these colorants.

|  | Ink 2A | Ink 2B | Ink 2C | Ink 2D | Ink 2E |
|---|---|---|---|---|---|
| Ingredients |  |  |  |  |  |
| DR 75 magenta dye | 3.0 | 3.0 | — | — | — |
| AR 52 magenta dye | 2.0 | 2.0 | — | 1.0 | — |
| AR 249 magenta dye | — | — | — | 4.0 | — |
| AY 23 yellow dye | — | — | 5.0 | — | — |
| DY 123 yellow Dye | — | — | — | — | 5.0 |
| Butyl urea | 7.0 | 7.0 | 7.0 | 7.0 | 7.0 |
| Triethylene glycol | 5.0 | — | — | — | — |
| Diethylene glycol | — | — | 5.0 | 7.0 | 7.0 |
| 2-pyrrolidone | 3.0 | — | 3.0 | 5.0 | 5.0 |
| 1,6-hexanediol | — | 5.0 | — | — | — |
| Surfynol 465 | 0.2 | 3.0 | 0.2 | 0.5 | 0.5 |
| Water (to 100%) | Balance | Balance | Balance | Balance | Balance |
| Properties |  |  |  |  |  |
| Decap | >1,000 | >1,000 | >1,000 | >1,000 | >1,000 |
| Nozzle Strength | Excellent | Good | Excellent | Excellent | Excellent |
| Gloss | 44 | 43 | 47 | 47 | 56 |
| Chroma | 76 | 78 | 122 | 78 | 114 |
| Optical Density | 2.20 | 2.09 | 1.60 | — | — |

Inks 2F and 2G are control samples to showing that without the prescribed first humectant, results are inferior in decap.

|  | Ink 2F Control | Ink 2G Control |
|---|---|---|
| Ingredients |  |  |
| DR 75 Magenta Dye | 3.0 | 3.0 |
| AR 52 Magenta Dye | 2.0 | 2.0 |
| Urea | — | 7.0 |
| Triethylene glycol | — | 5.0 |
| Diethylene glycol | 5.0 | — |
| 2-pyrrolidone | 10.0 | 3.0 |

-continued

|  | Ink 2F Control | Ink 2G Control |
|---|---|---|
| Surfynol 465 | 0.5 | 0.5 |
| Water (to 100%) | Balance | Balance |
| Properties |  |  |
| Decap | 100 | 200 |
| Nozzle Strength | Good | Good |
| Gloss | 43 | 45 |
| Chroma | 76 | 76 |
| Optical Density | 2.21 | 2.27 |

Example 3

Comparative

Comparative inks 3A-3E were made with formulations similar to those inventive ink 1A and 1C, but without the butyl urea or with other alkyl ureas (methyl urea or 1,1-dimethyl urea) in place of butyl urea. Comparative Inks 3F-3K were formulated with urea or methyl urea as the only humectant, analogous to Inventive ink 1D.

None of the comparative inks have the advantageous decap or nozzle strength demonstrated by the inventive inks in Example 1, although methyl urea, ethyl urea or dimethyl urea can help reduce bronzing.

|  | Ink 3A Comp. | Ink 3B Comp. | Ink 3C Comp. | Ink 3D Comp. | Ink 3E Comp. |
|---|---|---|---|---|---|
| Ingredients |  |  |  |  |  |
| DB 199 | 6.0 | 6.0 | 6.0 | 6.0 | 6.0 |
| Urea | — | 7.0 | — | — | — |
| Methyl urea | — | — | 7.0 | — | — |
| 1,1-dimethyl urea | — | — | — | 7.0 | — |
| Ethyl urea | — | — | — | — | 7.0 |
| Diethylene glycol | 5.0 | 5.0 | 5.0 | 5.0 | 5.0 |
| 2-pyrrolidone | 3.0 | 3.0 | 3.0 | 3.0 | 3.0 |
| Surfynol 465 | 0.1 | 0.2 | 0.2 | 0.2 | 0.2 |
| Water (to 100%) | Balance | Balance | Balance | Balance | Balance |
| Properties |  |  |  |  |  |
| Decap | 30 | 200 | 100 | 80 | 400 |
| Nozzle Strength | Weak | Weak | OK | Good | OK |
| Bronzing | C | C | A | AA | AA |
| Gloss | 76 | 62 | 45 | 40 | 41 |
| Chroma | 61 | 67 | 68 | 69 | 68 |
| Optical Density | 1.58 | 2.13 | 2.36 | 2.39 | 2.36 |

|  | Ink 3F Comp. | Ink 3G Comp. | Ink 3H Comp. | Ink 3I Comp. | Ink 3J Comp. | Ink 3K Comp. |
|---|---|---|---|---|---|---|
| Ingredients |  |  |  |  |  |  |
| DB 199 | 4.0 | 4.0 | 6.0 | 6.0 | 4.0 | 6.0 |
| Urea | 10.0 | — | 15.0 | — | — | — |
| Methyl urea | — | 10.0 | — | 15.0 | — | — |
| Ethyl urea | — | — | — | — | 10.0 | 15.0 |
| Surfynol 465 | 0.5 | 0.5 | 0.3 | 0.3 | 0.5 | 0.3 |
| Water (to 100%) | Balance | Balance | Balance | Balance | Balance | Balance |
| Properties |  |  |  |  |  |  |
| Decap | 200 | 100 | 100 | 300 | 200 | 800 |
| Nozzle Strength | Weak | Good | Good | Good | Good | Good |
| Bronzing | C | AA | C | A | AA | A |
| Gloss | 72 | 40 | 82 | 45 | 41 | 46 |
| Chroma | 71 | 73 | 62 | 72 | 73 | 68 |
| Optical Density | 2.04 | 2.34 | 1.67 | 2.20 | 2.35 | 2.07 |

Example 4

Comparative

Inks 4A-4D are formulated with 1,3-dimethylurea or 1,3-diethylurea in place of butyl urea. Results show comparative inks lack the advantageous decap properties of the inventive inks.

|  | Ink 4A Comp. | Ink 4B Comp. | Ink 4C Comp. | Ink 4D Comp. |
|---|---|---|---|---|
| Ingredients |  |  |  |  |
| DB 199 Cyan Dye | 6.0 | 6.0 | — | — |
| DR 75 Magenta Dye | — | — | 4.0 | 4.0 |
| AR 52 Magenta dye | — | — | 1.0 | 1.0 |
| 1,3-dimethylurea | 7.0 | — | 7.0 | — |
| 1,3-diethylurea | — | 7.0 | — | 7.0 |
| Diethylene glycol | 5.0 | 5.0 | 5.0 | 5.0 |
| 2-pyrrolidone | 3.0 | 3.0 | 3.0 | 3.0 |
| Surfynol 465 | 0.2 | 0.2 | 0.5 | 0.5 |
| Water (to 100%) | Balance | Balance | Balance | Balance |
| Properties |  |  |  |  |
| Decap | 300 | 500 | 40 | 30 |
| Nozzle Strength | Excellent | Excellent | Excellent | Excellent |
| Bronzing | AA | AA | AA | AA |
| Gloss | 40 | 39 | 44 | 43 |
| Chroma | 68 | 69 | 78 | 79 |
| Optical Density | 2.37 | 2.34 | 2.29 | 2.21 |

|  | Ink 4E Comp. | Ink 4F Comp. | Ink 4G Comp. |
|---|---|---|---|
| Ingredients |  |  |  |
| DB 199 Cyan Dye | 4.0 | 4.0 | — |
| DR 75 Magenta Dye | — | — | 4.0 |
| AR 52 Magenta dye | — | — | 1.0 |
| 1,3-dimethylurea | 10.0 | — | — |
| 1,3-diethylurea | — | 10.0 | 10.0 |
| Surfynol 465 | 0.5 | 0.5 | 0.5 |
| Water (to 100%) | Balance | Balance | Balance |
| Properties |  |  |  |
| Decap | 70 | 70 | 10 |
| Nozzle Strength | Good | Good | Weak |
| Bronzing | AA | AA | AA |
| Gloss | 41 | 39 | 44 |
| Chroma | 74 | 74 | 80 |
| Optical Density | 2.32 | 2.36 | 2.29 |

Example 5

This example is similar to Example 1A, but with higher surfactant level. Results indicate that these higher levels of surfactant can be disadvantageous for bronzing, gloss, OD and chroma, but that favorable decap is still achieved.

|  | Ink 5A | Ink 5B |
|---|---|---|
| Ingredients |  |  |
| DB 199 Cyan Dye | 6.0 | 6.0 |
| Butyl urea | 7.0 | 7.0 |
| Diethylene glycol | 5.0 | 5.0 |
| 2-pyrrolidone | 3.0 | 3.0 |
| Silwet L-7606 | 1.0 | — |
| Surfynol 465 | — | 1.0 |
| Water (to 100%) | Balance | Balance |
| Properties |  |  |
| Decap | >1000 | >1000 |
| Nozzle Strength | Excellent | Excellent |
| Bronzing | C | B |
| Gloss | 89 | 55 |
| Chroma | 65 | 65 |
| Optical Density | 1.94 | 2.08 |

Example 6

The following inks employ the butyl urea in combination with various other "second humectant". Again, advantageous properties are achieved.

|  | Ink 6A | Ink 6B |
|---|---|---|
| Ingredients |  |  |
| DB 199 Cyan Dye | 6.0 | 6.0 |
| Butyl urea | 7.0 | 7.0 |
| Xylose | 5.0 | — |
| Triethylene glycol | — | 5.0 |
| Tetramethylene sulfoxide | 3.0 | — |
| 1,3-dimethyl-2-imidazolidinone | — | 3.0 |
| Surfynol 465 | 0.3 | 0.3 |
| Water (to 100%) | Balance | Balance |
| Properties |  |  |
| Decap | >1000 | >1000 |
| Nozzle Strength | Good | Good |
| Bronzing | C | A |
| Gloss | 93 | 48 |
| Chroma | 67 | 69 |
| Optical Density | 1.77 | 2.18 |

Example 7

Comparative

This example demonstrates that when the colorant is pigment rather than dye, as in the inventive inks, advantageous decap results are not achieved.

|  | Ink 7A Comp. |
|---|---|
| Ingredients |  |
| Self-dispersing carbon black pigment | 3.5 |
| Butyl urea | 10.0 |
| Diethylene glycol | 5.0 |
| 2-pyrrolidone | 5.0 |
| Surfynol 465 | 0.2 |
| Water (to 100%) | Balance |
| Properties |  |
| Decap | 60 |
| Nozzle Strength | Good |
| Optical Density | 1.05 |

The self-dispersing carbon black pigment used in this example was prepared by oxidizing carbon black (Nippex 180 from Degussa, surface area 150 m$^2$/g) with ozone according to the process described in WO01/94476. The median particle size was about 98 nm. Potassium hydroxide was used to neutralize the treated pigment to a pH of 7. The neutralized mixture was purified by ultra-filtration to remove free acids, salts, and contaminants. The purification process was performed to repeatedly wash pigment with de-ionized water until the conductivity of the mixture leveled off and remained relatively constant.

The invention claimed is:

1. An ink-jet ink comprising an aqueous vehicle and a dye soluble in said aqueous vehicle, wherein said aqueous vehicle comprises water and a first humectant consisting of butyl urea, and wherein the amount of said first humectant is in the range of 2.5 weight % to 9.99 weight % based on the total weight of ink.

2. The ink of claim 1 wherein the dye concentration is greater than 3 weight % based on the total weight of ink.

3. The ink of claim 1, wherein the aqueous vehicle further comprises a second humectant selected from the group consisting of ethylene glycol, diethylene glycol, triethylene glycol, 1,2-propanediol, 1,3-propanediol, glycerol, ethoxylated glycerol, 1,4-butanediol, 1,5-pentanediol, 1,6-hexanediol, 2,5-hexanediol, 2-pyrrolidone, sulfolane, tetramethylsulfoxide, gamma-butyrolactone, xylose, fructose, and mannose and any combination thereof.

4. The ink of claims 1 or 3 wherein the dye comprises Direct Blue 199, Acid Yellow 23, Direct Yellow 132, Direct Red 75, Acid Red 249 and/or Acid Red 52.

5. The ink of claim 3 wherein the cumulative amount of first and second humectant is in the range of 8 weight % to 25 weight % of the total weight of ink.

6. The ink of claim 1 wherein the dye concentration is at least 4 weight % based on the total weight of ink.

7. A method for inkjet printing onto a substrate, comprising the steps of:
    (a) providing an inkjet printer that is responsive to digital data signals;
    (b) loading the printer with a substrate to be printed;
    (c) loading the printer with an ink as set forth in any of the preceding claims; and
    (d) printing onto the substrate using the ink or inkjet ink set in response to the digital data signals.

* * * * *